Aug. 28, 1956  D. C. ALBERHASKY  2,760,427
PORTABLE OUTDOOR GRILL
Filed Dec. 8, 1954  2 Sheets-Sheet 1

Don C. Alberhasky
INVENTOR.

BY Clarence A. O'Brien
and Harvey B. Jacobson
Attorneys

Aug. 28, 1956   D. C. ALBERHASKY   2,760,427
PORTABLE OUTDOOR GRILL
Filed Dec. 8, 1954   2 Sheets-Sheet 2

Don C. Alberhasky
INVENTOR.

BY *Clarence A. O'Brien*
*and Harvey B. Jacobson*
Attorneys

United States Patent Office 2,760,427
Patented Aug. 28, 1956

2,760,427

PORTABLE OUTDOOR GRILL

Don C. Alberhasky, Iowa City, Iowa

Application December 8, 1954, Serial No. 473,786

3 Claims. (Cl. 99—419)

This invention relates generally to cooking apparatus, and more specifically to the portable outdoor type utilized by campers or picnickers.

Although portable outdoor grills are quite common, outdoor cooking is rapidly becoming universally popular, wherein the outdoor chef is constantly seeking improved means and equipment to provide a greater degree of control in his outdoor culinary efforts. Inasmuch as charcoal or other similar fuel is generally used in outdoor portable cookers, and the hot coals thereof are generally used for the cooking, the control of the amount of heat obtained therefrom in regard to the specific food being cooked, i. e., thick or thin steaks, chops or fish, is vital in order to produce a readily palatable end product.

Thus, a primary object and purpose of this invention is to provide a portable outdoor grill constructed of relatively few parts, permitting substantial cooking heat control.

An additional object of invention is to provide in a portable outdoor grill including a central firebox, relatively pivoted food holding members associated therewith, in conjunction with grease disposal gutters and means for controlling the position of the pivoted grill members relative to the heat source in order to provide controlled outdoor cooking.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
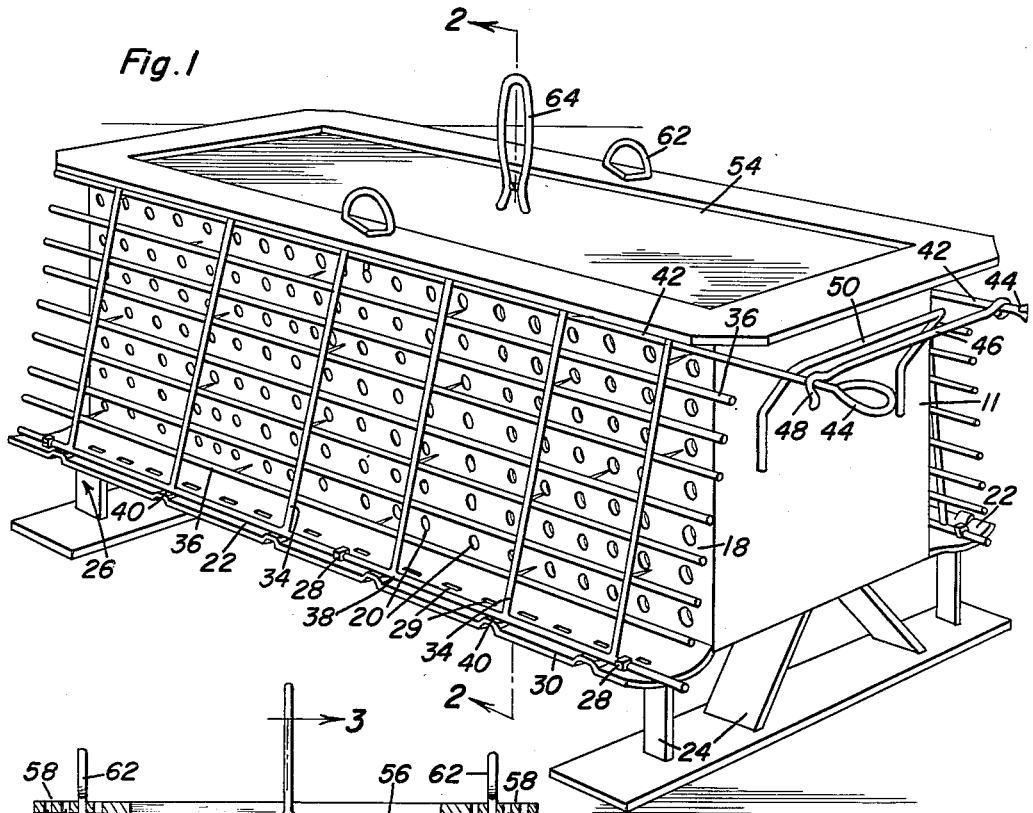
Figure 1 is a perspective view of my novel cooking apparatus constructed in accordance with a preferred embodiment of the invention, showing it in a position ready for use.

Referring to the drawings, the central firebox portion 10 includes two solid end portions 11, a perforate bottom 12 containing openings 14 therein to permit the entrance of oxygen therethrough for combustion of the charcoal 16, for example, and the removal or sifting of ashes therethrough, and two perforated side wall members 18 which include the perforations 20 which permit the exit of cooking heat from the combustible fuel. Extending transversely on the lower edge of the firebox where the side walls 18 connect to the lower portion 12 are two similar grease gutters 22 to readily permit the removal of fat drippings during the cooking process.

The firebox and gutter members are supported at each end by end support members 24 and 26 which are of different heights in order to provide suitable drainage for the grease gutters wherein the grease may be caught in a suitable receptacle 27 or fall through suitably transversely spaced slots 29 in the bottom of gutters 22. A general reference character is used to indicate the end supports inasmuch as any suitable varied height support means may be used for this purpose.

Transversely spaced along each of the grease drain gutters are grill hinge members 28 which are located adjacent the outer edge 30 of each of the drain gutters. These hinge members may be secured to the drain gutters by means of screws 32 extending through the bottom of each of the drain gutters.

The grill member consists of a plurality of vertical and parallel rod members 34 and 36, respectively. The lower parallel rod member 38 is secured in the hinge members 28. Located along the outer edge of each of the drain gutters in the pivotal path of each of the vertical rod members 34 is a raised angular portion 40 which when the grill member is pivoted downwardly for the purpose of receiving food, supports the grill in a relatively raised position to make it more accessible to the cook.

The uppermost parallel rod members 42 include an extending portion 44 providing a handle by which the grill members may be pivoted. Pivoted on one of the upper rod members 42 is a hook member 46 with a latch portion 48 for hooking over the other upper rod member 42 of the other grill member to prevent accidental outward pivotal movement of the grill. The end wall portions of the firebox include suitable handles 50 secured thereto. Adequately spaced on the side of the rod members 34 and 36 adjacent the perforated side walls 18 are suitable food penetrating pin members 52.

Figure 2:
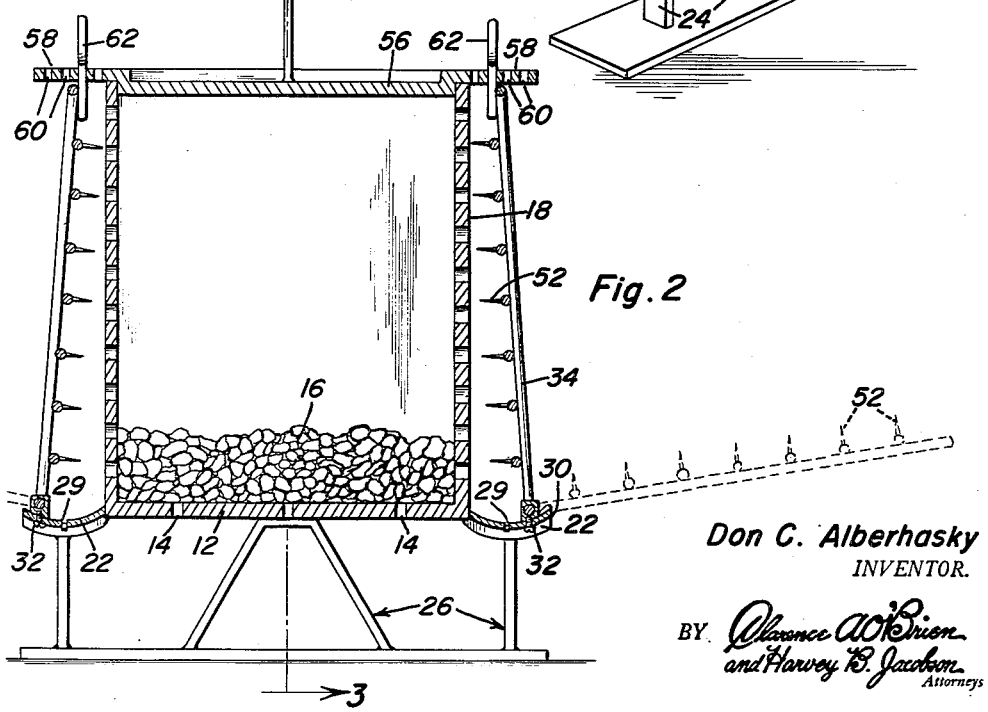
Figure 2 is an enlarged transverse sectional view taken on line 2—2 of Figure 1.
Figure 3:
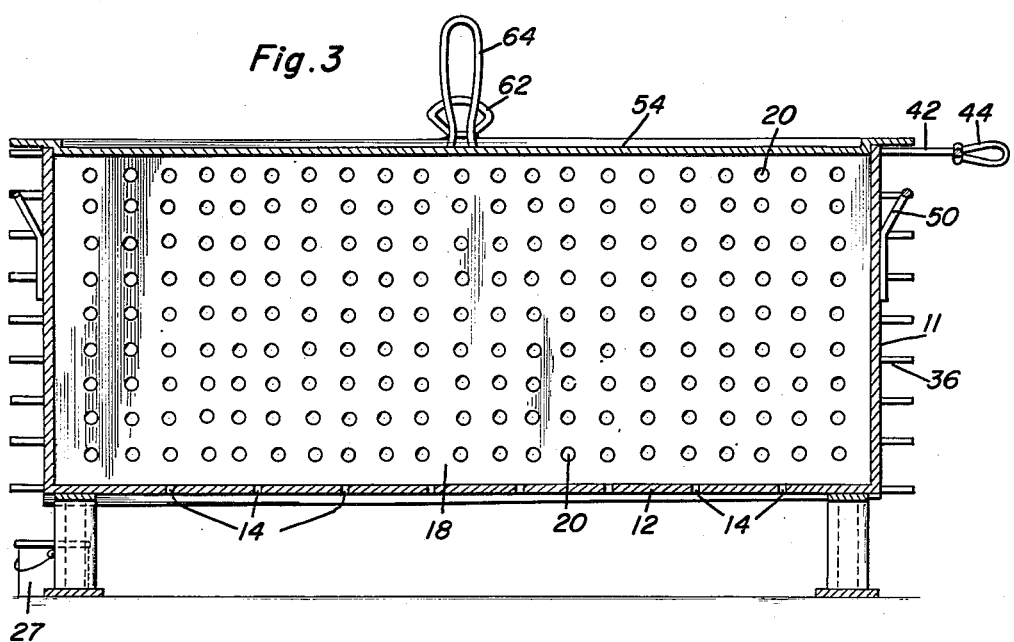
Figure 3 is a longitudinal sectional view of the device taken on line 3—3 of Figure 2.
Figure 4:
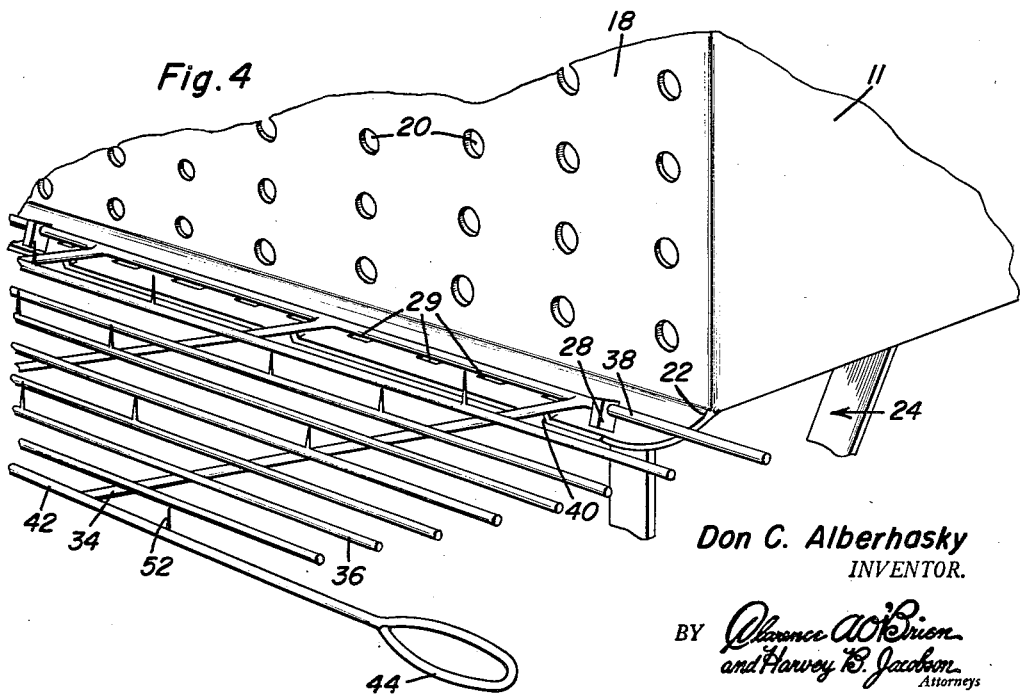
Figure 4 is an enlarged view of the lower nearest corner of Figure 1 to show the hinge connection between the grill member and the grease gutters, with the grill being shown in a position to receive the food to be cooked.

The top of the firebox includes a removable cover member 54 permitting the entry of fuel, as well as providing a suitable space for placing cooking utensils for other types of cooking other than broiling. As clearly seen in Figure 2, the cover member 54 includes a central recessed portion 56 fitting within the firebox. The cover member 54 also includes side flange members 58 which have a plurality of transverse apertures 60 contained therein. The apertures 60 may accommodate adjustable pin members 62 which when placed in the apertures 60 extend therethrough to be in the pivotal path of the pivotal grill members. Thus, by adjusting the pin members 62 relative to the side walls 18 of the firebox, it is possible to control the amount of cooking heat applied to the food secured to the pin members 52 by spacing the pivotal grill members from the firebox.

A suitable handle 64 is provided on the top of the cover member.

Any term, such as "front," "rear," "right" and "left" or any other directional terms are intended to have only a relative connotation to aid in describing the device and are not intended to be interpreted as requiring any particular orientation with respect to any external elements.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A portable grill comprising a rectangular fuel container with an open top, concave elongated grease drains secured on the lower edges of said fuel container, support members at each end of said container, said support members being of different heights to provide a pitch to said grease drains, hinge means in said grease drain, pivoted open grill members pivotally secured to said hinge means at the outer edge of said grease drains, food penetrating means secured on said grill members adjacent said container, a removable cover member for providing a flat cooking surface, and means on said cover operatively associated with said grill members for adjusting the position of said grill members relative to said fuel container for controlling the distance of said grill members relative to said container and providing controlled outdoor cooking.

2. The portable grill set forth in claim 1 including grill securing means between said grill members for preventing the accidental outward pivotal movement thereof.

3. A portable grill comprising a rectangular open top perforated fuel container including perforated sides and bottom, grease drain members secured to the lower edges at the juncture of the perforated bottom and sides, support members at each end of said fuel container, said support members being of a different height providing a pitch to said grease drain members for disposing of liquid waste during cooking, hinge members located on an outer edge of said grease drain members, pivotal grill members including intermediately secured horizontal and vertical rods pivotally associated with said hinge members, food penetrating means secured to said pivotal grill members operable to be located adjacent the perforated sides of said container, a removable cover member for permitting the insertion of fuel and utensil heating, adjustable means on said cover member comprising means forming a plurality of transverse apertures on said cover member, a removable pin member insertable in said apertures and including a lower portion operable to contact said pivotal grill members for controlling the relationship of said pivotal grill members relative to said container for providing controlled cooking, and means connected between said pivotal grill members for securing said grill members in a fixed relationship.

References Cited in the file of this patent

UNITED STATES PATENTS

| 161,856 | Bliss | Apr. 13, 1875 |
| 2,408,935 | Kunst | Oct. 8, 1946 |

FOREIGN PATENTS

| 6,968 of 1906 | Australia | Sept. 20, 1906 |
| 1,049,663 | France | Aug. 19, 1953 |